US006990138B2

(12) United States Patent  
Bejjani et al.

(10) Patent No.: US 6,990,138 B2  
(45) Date of Patent: Jan. 24, 2006

(54) CORRELATED SPREADING SEQUENCES FOR HIGH RATE NON-COHERENT COMMUNICATION SYSTEMS

(75) Inventors: Elie Bejjani, Baabda (LB); Celine Durand, Paris (FR)

(73) Assignee: Alcatel, Paris (FR)

( * ) Notice: Subject to any disclaimer, the term of this patent is extended or adjusted under 35 U.S.C. 154(b) by 754 days.

(21) Appl. No.: 09/983,974

(22) Filed: Oct. 26, 2001

(65) Prior Publication Data

US 2002/0097781 A1    Jul. 25, 2002

(30) Foreign Application Priority Data

Oct. 27, 2000    (EP) ................... 00440287

(51) Int. Cl.
*H04B 1/69*    (2006.01)
*H04B 1/707*   (2006.01)
*H04B 1/713*   (2006.01)

(52) U.S. Cl. ............... 375/146; 370/342; 375/130; 375/140; 375/146; 375/151

(58) Field of Classification Search ............ 370/342; 375/140, 141, 146, 151, 130
See application file for complete search history.

(56) References Cited

U.S. PATENT DOCUMENTS

| | | | | |
|---|---|---|---|---|
| 5,008,898 A | * | 4/1991 | Hamatsu et al. | ............ 375/151 |
| 5,938,787 A | * | 8/1999 | Stark | ............ 714/755 |
| 5,995,533 A | * | 11/1999 | Hassan et al. | ............ 375/140 |
| 6,075,812 A | * | 6/2000 | Cafarella et al. | ............ 375/141 |
| 6,393,047 B1 | * | 5/2002 | Popovic' | ............ 375/140 |
| 6,501,788 B1 | * | 12/2002 | Wang et al. | ............ 375/148 |
| 6,574,270 B1 | * | 6/2003 | Madkour et al. | ............ 375/148 |
| 6,614,836 B1 | * | 9/2003 | Halford et al. | ............ 375/152 |
| 6,665,288 B1 | * | 12/2003 | Ottosson et al. | ............ 370/342 |
| 2002/0097781 A1 | * | 7/2002 | Bejjani et al. | ............ 375/146 |

OTHER PUBLICATIONS

An algebraic approach to vector quantization, Penzhorn, W.T.; Communications and Signal Processing, 1988. Proceedings., COMSIG 88. Southern African Conference on , Jun. 24, 1988, pp. 153-158.*

A. G. Burr , "Spherical Codes for M-Ary Code Shift Keying", National Conference on Telecommunications, GB, London, IEE, vol. Conf. 2, Apr. 2, 1989, pp. 67-62, XP000041169.

Ian Oppermann et al, "Complex Spreading Sequences with a Wide Range of Correlation Properties", IEEE Transactions on Communications, vol. 45, No. 3, Mar. 1997, pp. 365-375.

* cited by examiner

*Primary Examiner*—Stephen Chin
*Assistant Examiner*—Erin M. File
(74) *Attorney, Agent, or Firm*—Sughrue Mion, PLLC

(57) ABSTRACT

The invention relates notably to a method for modulating information symbols to be transmitted in a CDMA communication network by using a non-orthogonal modulation code comprising M spreading sequences ($s_m$ $1 \leq m \leq M$), each comprising in N chips ($s_{m,n}$ $1 \leq n \leq N$), the M spreading sequences having the same energy.

According to the invention, the amplitude of the chips take a plurality of values the number M of spreading sequences is higher than the number of chips N per spreading sequence.

8 Claims, 3 Drawing Sheets

CORRELATED SPREADING SEQUENCES FOR HIGH RATE NON-COHERENT COMMUNICATION SYSTEMS

BACKGROUND OF THE INVENTION

The present invention relates to communication systems and in particular to modulation of information symbols in communication systems.

In usual communication systems, for example wireless communication systems, information symbols are coded and modulated at the sender, transmitted on the medium and demodulated and decoded at the receiver.

Depending on the communication system, demodulation can be performed in a coherent or a non-cohere rent manner.

Coherent detection requires equalization and channel response estimation so that the effects of phase and magnitude distortion caused by the communication channel can be compensated for with matched filters. Coherent demodulation brings prohibitive complexity and poor robustness.

Non-coherent detection, on the contrary, is based on the fact that decision for received symbols can be made without compensating for the phase distortion of the received signal. Non-coherent detection at the receiver is preferred to coherent detection because of the relative simplicity at the receiver.

As is well known from those skilled in the art, orthogonal modulation are conventionally used since specially good appropriate for non-coherent detection at the receiver. However, signals modulated by an orthogonal modulation are very bandwidth consuming. A compromise often consists in reducing the bandwidth by using non-orthogonal modulations resulting however in a performance degradation in the non-coherent detector since the transmitted signals are correlated.

The design of multidimensional constellations for non-coherent, non-orthogonal modulations has proved to be a good way to compensate the performance degradation at the non-coherent receiver.

In multiple users communication networks, there are several ways for users to send information through the communication channel. For both Time Division Multiple Access (TDMA) and Frequency Division Multiple Access (FDMA) techniques, the channel is basically partitioned into equal independent and non-overlapping single user subchannels. Each user is respectively assigned a particular time slot within each frame or a frequency subchannel. These techniques are frequently used in data and digital voice transmission. However both methods tend to be inefficient when users transmit bursty information. In this particular case, an alternative is to allow more than one user to share a channel or subchannel by use of direct-sequence spread spectrum signals. In this technique, called Code Division Multiple Access (CDMA), each user is assigned a unique code sequence and spreads the information signal across the assigned frequency band. Thus, signals from the various users are separated at the receiver by cross-correlation of the received signal with each of the possible user signature sequences. CDMA is a promising technique for radio access in future cellular mobile and personal communication systems. It offers some attractive features compared to TDMA or FDMA such as the potential for high radio capacity, soft handover, simplified frequency planning, etc.

In non-coherent TDMA and FDMA systems, Q-ary Frequency Shift Keying (FSK) is used and non-coherent detection is made with Q orthogonal FSK signals having a tone spacing equal to the inverse of the symbol period. Reducing the tone spacing of FSK signals leads to non-orthogonal modulations that can be advantageously used to reduce the bandwidth of the modulated signals.

In non-coherent CDMA systems, the modulation is preferably chosen to be a family of orthogonal spreading sequences, e.g. Walsh-Hadamard. However, the number of strictly orthogonal spreading sequences is limited for a given spreading sequence length (the spectral efficiency of orthogonal spreading sequences is poor). Non-orthogonal spreading sequences are then advantageously used to enhance the system capacity. They are mainly characterised by their cross-correlation, which is equivalent to the tone non-orthogonality in the FSK case.

A known solution is to replace the Walsh-Hadamard set by a new non-orthogonal set. When this kind of sets cannot be used, one can think of considering several masked versions of an initially orthogonal set (used for instance in IS-95 systems). An alternative is to use well known families of PN-like sequences (e.g. Gold or Kasami sequences).

U.S. Pat. No. 5,938,787 describes a method of encoding information symbols according to a concatenation of an error correction code and a non-orthogonal modulation code where the non-orthogonal modulation code is obtained by a translation of a set of orthogonal code vectors according to a predetermined translation. This modulation set contains spreading sequences with binary chip values. This fact implies a strong limitation on the number of spreading sequences that could be generated. Indeed, when considering spreading sequences of N chips length, the ultimate upper limit on the number of spreading sequences is $2^N$. A large number of these $2^N$ spreading sequences is not usable since a limit for the cross-correlation value between the spreading sequences should be ensured.

In "Complex spreading sequences with a wide range of correlation properties" (I. Opperman and B. Vucetic, IEEE transaction on communications, VOL. 45 NO. 3, March 1997, pages 365 to 375), a method for building sets of complex spreading sequences with good correlation properties is presented. For ensuring good correlation properties, the number of spreading sequences M constituting the alphabet is chosen smaller than the spreading sequence length N.

All above described modulation sets have a low spectral efficiency. The spectral efficiency can defined be as $\log_2(M)/N$ and represents the number of bits to map a sequence divided by the sequence length. This quantity is given in bit/s/Hz. For the modulation sets described above, the spectral efficiency is <<1 (very smaller than one).

The object of the present invention is to provide a method for transmitting coded information symbols in a communication network by using a non-orthogonal modulation code having a large spectral efficiency.

Another object of the invention is to provide a non-orthogonal modulator for performing the above mentioned method.

Another object of the present invention is to provide non-orthogonal modulation codes families to be used by the non-orthogonal modulator.

SUMMARY OF THE INVENTION

These objects, and others that appear below, are achieved by a method for modulating information symbols to be transmitted in a CDMA communication network by using a non-orthogonal modulation code comprising M spreading sequences ($s_m$ $1 \leq m \leq M$), each comprising in N chips ($s_{m,n}$ $1 \leq n \leq N$) used to modulate said coded information symbols, said M spreading sequences having the same energy $$\left( \sum_{n=1}^{N} s_{m,n}^2 \right),$$

the amplitude of said chips taking a plurality of values, and said number M of spreading sequences being higher than the number of chips N per spreading sequence.

These objects are also achieved by a non-orthogonal modulation codes family comprising M spreading sequences ($s_m$ $1 \leq m \leq M$), each comprising in N chips ($s_{m,n}$ $1 \leq n \leq N$) used to modulate said coded information symbols, said M spreading sequences having the same energy $$\left( \sum_{n=1}^{N} s_{m,n}^2 \right),$$

the amplitude of said chips taking a plurality of values; and said number M of spreading sequences being higher than the number of chips N per spreading sequence.

These objects are further attained by a modulator for modulating coded information signal with non-orthogonal spreading sequences characterized in that it comprises:

means for generating non-orthogonal spreading sequence families comprising M spreading sequences ($s_m$ $1 \leq m \leq M$), each comprising in N chips ($s_{m,n}$ $1 \leq n \leq N$) used to modulate said coded information symbols, said M spreading sequences having the same energy $$\left( \sum_{n=1}^{N} s_{m,n}^2 \right),$$

the amplitude of said chips taking a plurality of values; and said number M of spreading sequences being higher than the number of chips N per spreading sequence; and means for storing said non-orthogonal spreading sequences.

The spreading sequence sets according to the invention have the advantage to have a spectral efficiency that can easily exceed 1 bit/s/Hz.

Another advantage of this method is that it increases the capacity of the communication network.

In a preferred embodiment of the invention, the spreading sequences constituting the non-orthogonal modulation code have a cross correlation smaller than a predefined threshold.

In another preferred embodiment, the modulation code according to the invention is combined with an efficient error correction code to compensate the fact that the correlation between the spreading sequences of the sets are not negligible.

Further advantageous features of the invention are defined in the dependent claims.

This invention is based on a priority application EP 00 44 0287 which is hereby incorporated by reference.

BRIEF DESCRIPTION OF THE DRAWINGS

Other characteristics and advantages of the invention will appear on reading the following description of a preferred implementation given by way of non-limiting illustrations, and from the accompanying drawings, in which:

FIG. 2 shows a set of non-orthogonal spreading sequences according to the invention having a sequence length of 2.

DETAILED DESCRIPTION OF THE INVENTION

Figure 1:
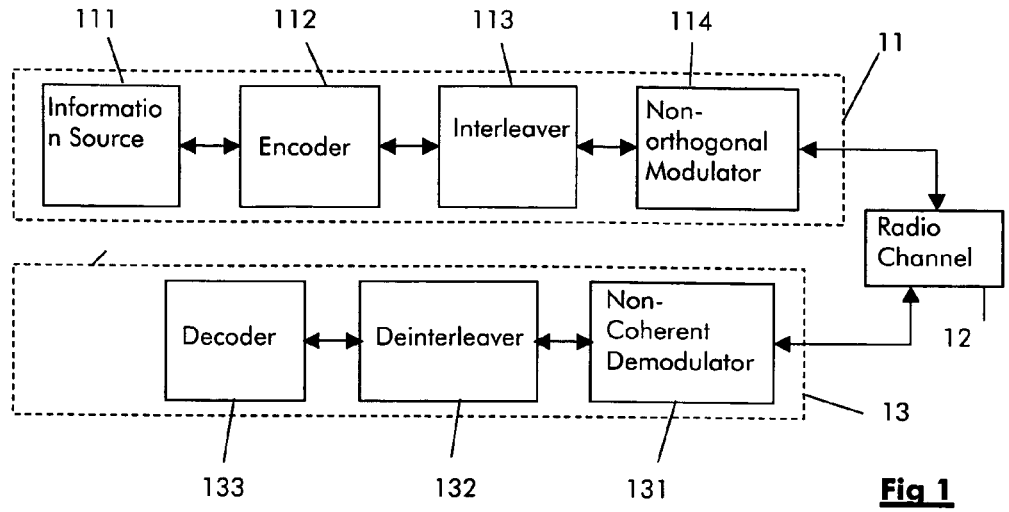
FIG. 1 shows a communication chain where a non-orthogonal modulation code according to the invention can be used.

FIG. 1 shows a communication chain where a non-orthogonal modulation code according to the invention can be used. Communication chain comprises a transmit part 11, a radio channel 12 and a receiver part 13. Transmit part comprises an information source 111, an encoder 112, an interleaver 113, a non-orthogonal modulator 114. Receiver part comprises a non-coherent demodulator 131, a deinterleaver 132 and a decoder 133. Non-orthogonal modulator 114, as known in the art, is responsible for transforming a numeric information flow composed of sequence of digital symbols in an electrical signal. Non-orthogonal modulator 114 supports the method according to the invention and generates an electrical signal having a period equal to the chip duration and an amplitude depending on the used spreading sequences. Spreading sequences to be used are generated and stored at non-orthogonal modulator 114.

A unique spreading sequence may be used at non-orthogonal modulator 114 as in usual multiple user CDMA systems. In that case, each user is allocated one spreading sequence. The information flow transmitted by each user is spread by the spreading sequence (i.e each symbol to be modulated is multiplied by the spreading sequence). In the uplink, the receiver (i.e. a base station) receives a composed signal consisting in a superposition of spread signals spread with different spreading sequences. By correlating the composed signal with the different spreading sequences, the receiver can extract the information flow of each user from the composed signal.

Alternatively, several spreading sequences may be used at the non-orthogonal modulator 114. In that case, the incoming digital information flow at the non-orthogonal modulator is considered as groups of K bits. There are $2^K$ possible groups of K bits. One spreading sequence is associated to each group of K bits. The modulator uses $2^K$ spreading sequences to modulate the signal. One spreading sequence corresponds in that case to one modulation symbol. This technique is called coded modulation. The electrical signal generated by non-orthogonal modulator 114 is a succession of electrical signals representing the successive spreading sequences associated to the successive symbols to transmit.

Any combination of the two above mentioned applications may be envisaged. For all these applications, the design of appropriate non-orthogonal spreading sequences is essential.

According to the invention, the proposed construction method consists in designing non-orthogonal spreading sequence sets containing a large number of spreading sequences M (M>>sequence length N) and ensuring a reasonable correlation value by allowing the chip value to be any real number instead of only ±1 as known in the art. These spreading sequences should be chosen with equal energy.

Geometrically this is equivalent to place M points on an N-dimensional sphere, while ensuring a good repartition of the correlations.

Each one of the M spreading sequences is related to one of M points on the N-dimensional sphere. The N components (chips) $s_{m,n}$ $1 \leq n \leq N$ of a spreading sequence are coordinates of the associated point on the N-dimensional sphere. The cross-correlation values between spreading sequences are directly related to angles between the associated points. The energy of the spreading sequence is proportional to $$\sum_{n=1}^{N} s_{m,n}^2$$

When allowing the use of the whole sphere, we can find diametrically opposed points, leading to a correlation value equal to 1. In that case, it would be impossible to distinguish at demodulation between the two spreading sequences.

Preferably, the M points should be placed on a half of the N-dimensional sphere only, so that the maximal correlation value never reaches one and remains smaller than a predefined threshold value smaller than one. A possible threshold values is 0,5. Other threshold values may be envisaged depending on the maximum accepted cross-correlation.

Real as well as complex spreading sequences are considered in the present invention. Complex spreading sequences being essentially used for base band transmission with an in-phase and in-quadrature path.

In the following several examples are given to illustrate sets of spreading sequences according to the present invention.

FIG. 2 shows an example of a non-orthogonal spreading sequence set according to the invention having a sequence length of 2.

The case M=8, N=2 corresponds to a family of 8 spreading sequences ($s_1, \ldots, s_8$) of length 2 detailed below.

| | |
|---|---|
| $s_1$ (1, 0) | $s_2$ (0.923, 0.382) |
| $s_3$ (0.707, 0.707) | $s_4$ (0.382, 0.923) |
| $s_5$ (0, 1) | $s_6$ (-0.382, 0.923) |
| $s_7$ (-0.707, 0.707) | $s_8$ (-0.923, 0.382) |

Figure 2A:
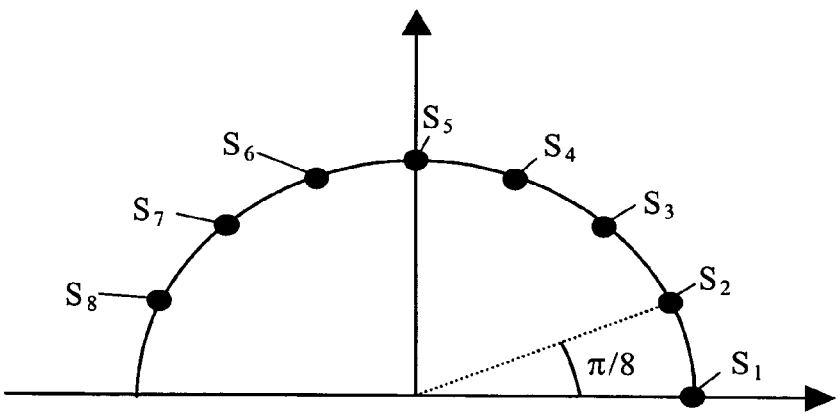
FIG. 2a is a geometrical representation of these.
Figure 2B:
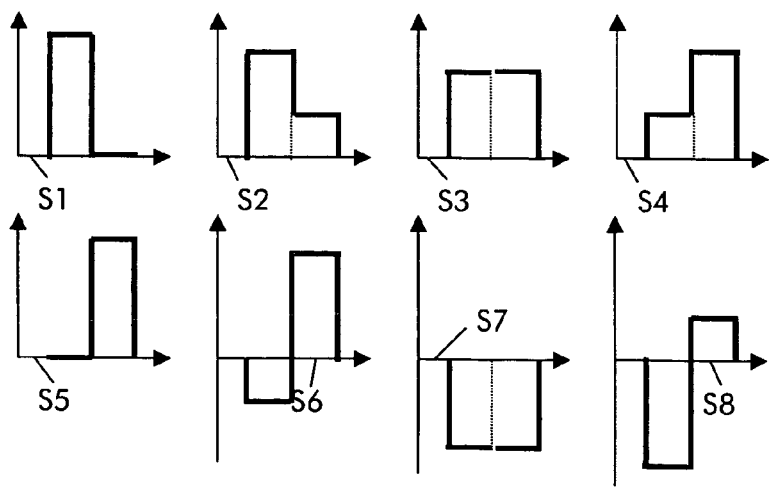
FIG. 2b represents the corresponding modulation codes and FIG. 2c represents an example of information flow modulated with said spreading sequences.

FIG. 2a gives the geometrical representation when the choice of the 8 points corresponding to the 8 spreading sequences of length 2 are located on the half unitary circle. The corresponding eight modulation code signals of length 2 are represented on FIG. 2b. In this case the chip value are chosen among a set of 8 chip values: 1, 0, 0,923, 0.382, 0.707, -0.382, -0.707, -0.923.

Figure 2C:
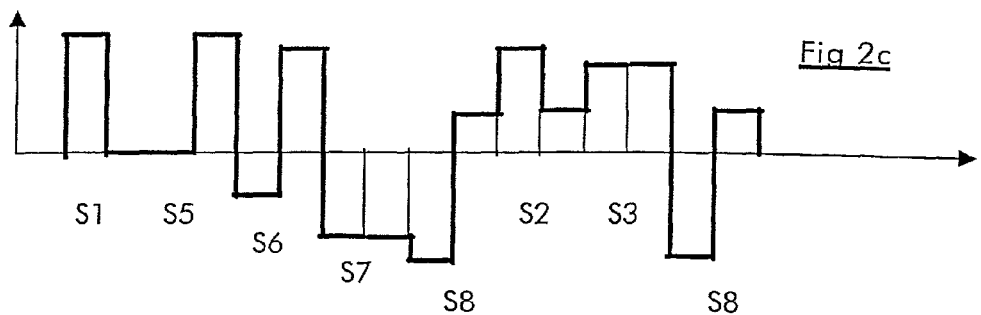

FIG. 2c represents an example of code modulated signal. In that case the digital sequence 000100101110111001010111 is modulated according to the present invention. One user is allocated all eight spreading sequences ($s_1, \ldots, s_8$). The bits of the digital sequences are grouped by three and each of the eight possible value for a group of three bits is attributed one of the eight spreading sequences.

Assumed that $s_1$ represents 000, $s_2$ represents 001, $s_3$ represents 010, ..., $s_8$ represents 111, then the modulated signal for the digital sequence is represented by the succession of spreading sequences $s_1, s_5, s_6, s_7, s_8, s_2, s_3, s_8$.

The correlation between any two spreading sequences $s_i$ and $s_j$, defined as the inner product between both associated points, is given by $\mu_{i,j} = \cos(\alpha_{i,j})$ where $\alpha_{i,j}$ is the angle between the geometrical representations of $s_i$ and $s_j$. $\mu_{i,j}$ is real and the maximum correlation value is given by $\mu_{max} = \cos(\pi/8)$. If the threshold value is set to $\mu_{max} = \cos(\pi/8)$, the family of 8 spreading sequence fulfill the requirements regarding the maximum correlation between two spreading sequences of the set.

This can be generalized to the case of M spreading sequences of length N=2 on the half unitary circle. For any couple ($s_i$, $s_j$), with $i \neq j$, $\mu_{max} = \cos(\pi/M)$.

M is directly related to the spectral efficiency. A trade-off is necessary between the spectral efficiency $\log_2(M)/N$ and the acceptable performance degradation due to not negligible maximum correlation value when M grows. The use of an efficient error correcting code in combination with a non-orthogonal modulation code according to the invention enables it to minimize the disadvantage of high correlating spreading sequences while increasing the capacity of the communication network.

A second example of a set of spreading sequences according to the present invention consists in considering lattice in higher dimension spaces to build sets of spreading sequences having a higher length.

The Gosset lattice, $E_8$, is the densest lattice in dimension 8. The lattice points are assimilated to the centers of unit spheres one tangent to the other. The number of tangent spheres to one sphere in the Gosset Lattice equals 240. Therefore, each point P of the lattice has 240 neighbors at the same minimal distance. These 240 points are as a consequence located on a sphere having as center the point P.

As a consequence, 240 spreading sequences having as eight successive chip values the eight coordinates of one of the 240 points form a family of spreading sequences according to the present invention.

Thanks to geometrical considerations in the space of dimension 8, the minimum angle between any two points associated to a spreading sequence is $\pi/3$, i.e. a maximal correlation $\cos(\pi/3) = 0.5$. As a consequence if the threshold value is chosen equal to 0.5, the non-orthogonal spreading sequence code comprises 240 spreading sequences.

This leads to the design of a family of 240 spreading sequences of length eight having a maximum correlation of 0.5 in comparison to the eight orthogonal sequences of length eight given by the Walsh-Hadamard set having a maximal correlation of zero.

The previous example can be generalized as follows:

Let's denote $\Omega_N$ the unit sphere of $R^N$ and (*) the usual inner product and (N,M,s) a subset of $\Omega_N$ of size M for which $(u*v) \geq s$ for all $u,v \in$ subset and $u \neq v$.

In the previous example, the subset (8,240,0.5) of $\Omega_8$ has been considered.

In dimension 24, the subset (24, 196560, 0.5) can be extracted from the Leech lattice $\Lambda_{24}$, and is also a modulation code according to the construction method of the present invention.

For a given length N, a subset according to the present invention extracted from a dense integer lattice always gives the maximum number of non-orthogonal spreading sequences with a correlation between each couple of spreading sequences smaller than a predefined threshold, than if the code were extracted from another lattice.

Another example of set of spreading sequences according to the present invention can be constructed as follows.

In analogy to a M-PSK (Pulse Shift Keying) modulation, a set of complex spreading sequence according to the present invention can be obtained.

A M-PSK modulating signal $u_m(t)$ can be expressed as follows:

$$u_m(t) = \exp(j\varphi_m) = \exp\left(j\frac{2\pi}{M}(m-1)t\right)$$

for $m = 1, \ldots, M$ and $\varphi_m \in [0, 2\pi]$.

Each component (chip) $s_{m,n}$ $1 \leq m \leq M$ of the nth. complex spreading sequence of the set is associated to one of the M possible phases in the M-PSK:

$$s_{m,n} = \frac{1}{\sqrt{N}} \exp\left(j\frac{2\pi}{M} \times ((n-1)(m-1))[M]\right) = \frac{1}{\sqrt{N}} \exp(j\beta_{m,n})$$

where n[M] denotes n modulo M. The phase $\beta_{m,n}$ is in $[0,2\pi]$ when $n=1, \ldots, N$ and $m=1, \ldots, M$.

The obtained M spreading sequences are distributed on an N-dimensional unit sphere.

Another example of a set of complex spreading sequences according to the present invention, consists in selecting M randomly chosen complex spreading sequences $s_m$ $1 \leq m \leq M$ of length N on a N-dimensional unit complex sphere.

$$s_m = \frac{1}{\sqrt{N}}(e^{j\varphi_1}, e^{j\varphi_2}, \ldots, e^{j\varphi_N})$$

where $\phi_n$ is a random variable uniformly distributed on $[0,2\pi]$.

Figure 3:
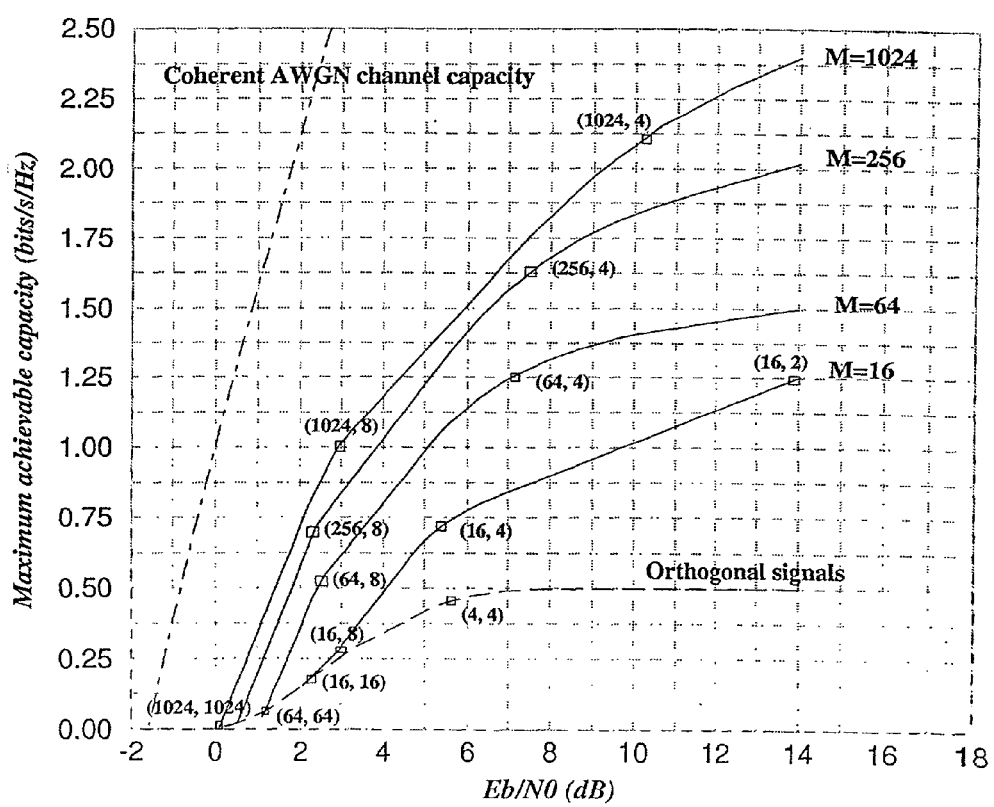
FIG. 3 shows the performance of a non-orthogonal spreading sequence set according to the invention compared to an orthogonal sequence set for a Additive White Gaussian Noise (AWGN) channel.
Figure 4:
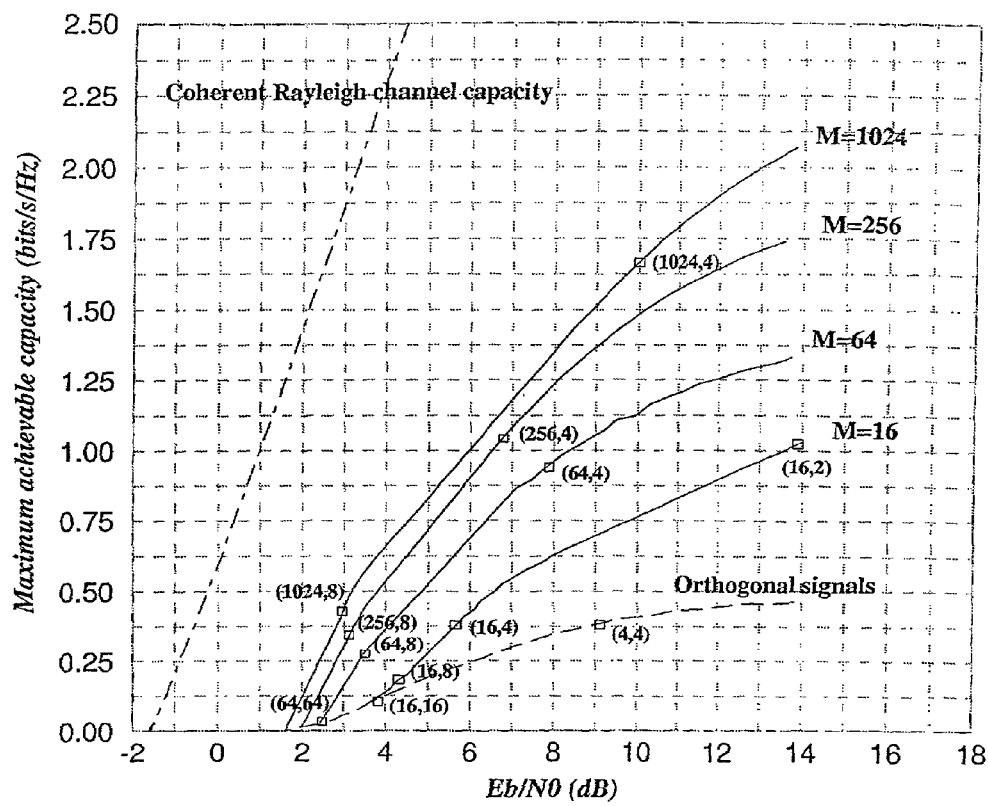
FIG. 4 shows the performance of a non-orthogonal spreading sequence set according to the invention compared to an orthogonal sequence set for a Raleigh fading channel.

FIG. 3, respectively FIG. 4, illustrates the performance of randomly generated non-orthogonal sets of complex spreading sequences for a AWGN channel, respectively for a Rayleigh fading channel.

For non-orthogonal signals and for a given size M of the set of spreading sequences, the envelope of the maximum achievable capacity curves with respect to $Eb/N_0$ for various lengths N is represented on the diagrams shown of FIGS. 3 and 4.

As reference to compare the performance, the envelope of capacity curves is also given for various N for orthogonal spreading sequences (M=N in this case).

Moreover, for comparison, we include a curve of the capacity of the considered AWGN or Rayleigh fading channel with coherent detection which represents an absolute upper limit.

Preferably, the non-coherent receiver for correlated signals consists in a maximum envelope detector at the output of the matched filters.

For all curves, the capacity is given in bit/s/Hz i.e. bits per complex dimension.

Non-orthogonal set of spreading sequences largely outperform orthogonal ones from a mutual information point of view whichever channel is considered. This performance enhancement can be obtained in practice with a reduced increase of the complexity.

For instance, a family of M=1024 correlated signals of length N=8 reaches a mutual information of 1 bit/s/Hz with a loss of 3 dB when compared to the coherent AWGN channel capacity (FIG. 3) while it reaches 0.5 bit/s/Hz with a loss of 3.5 dB when compared to the coherent Rayleigh channel capacity (FIG. 4).

For both channels, there is no orthogonal spreading sequence set able to exceed a mutual information of 0.5 bit/s/Hz. This maximum is reached by both orthogonal sets of size N=2 and N=4 at $Eb/N_0$ values far from the ones of the coherent channel capacity curves (respectively 8 and 16 dB on AWGN and Rayleigh channels).

However, with non-orthogonal signals, an increase of either the set size M or the sequence length N always leads to higher spectral efficiencies. Hence, there is a trade-off between the improvement of spectrum efficiency and the complexity of the set of spreading sequences.

According to the diagram shown on both FIG. 3 and FIG. 4, the non-orthogonal spreading sequence sets according to the present invention exhibit higher spectral efficiency than orthogonal sets and increase the capacity of the communication network.

The increase of the capacity of the communication network is preferably obtained by combining an efficient error correcting code to the use of the non-orthogonal spreading sequences according to the present invention. For example, a convolutional 2/3 encoding (octal generators 27, 75, 72) of a set of M=64 spreading sequences of length N=8 leads to a loss of only 2 dB from the maximum achievable capacity on AWGN non-coherent channel.

The method according to the invention may as well be used in a system combining CDMA (Code Division Multiple Access) and TDMA (Time Division Multiple Access) techniques also called TD-CDMA.

What is claimed is:

1. A method for modulating information symbols to be transmitted in a Code Division Multiple Access (CDMA) communication network, the method comprising using a non-orthogonal modulation code comprising M spreading sequences ($s_m$ $1 \leq m \leq M$), each comprising N chips ($s_{m,n}$ $1 \leq n \leq N$), to modulate said information symbols, said M spreading sequences having the same energy $$\left(\sum_{n=1}^{N} s_{m,n}^2\right),$$

the amplitude of said chips taking a plurality of values, and said number M of spreading sequences being higher than the number of chips N per spreading sequence.

2. The method according to claim 1, wherein the correlation between each couple of said spreading sequences is smaller than a predefined threshold.

3. The method according to claim 1, wherein said spreading sequences are extracted from a dense lattice in a space of dimension N.

4. The method according to claim 3, wherein said spreading sequences are extracted from the Gosset lattice (N=8).

5. The method according to claim 3, wherein said spreading sequences are extracted from the Leech lattice (N=24).

6. The method according to claim 1, characterized in that said chip values correspond to the coordinates of points randomly chosen on an N-dimensional complex sphere.

7. The method according to claim 1, characterized in that said symbols are coded with an efficient error correction code.

8. A modulator for modulating coded information signal with non-orthogonal spreading sequences, the modulator comprising:

means for generating non-orthogonal spreading sequence families comprising M spreading sequences ($s_m$ $1 \leq m \leq M$), each comprising in N chips ($s_{m,n}$ $1 \leq n \leq N$) used to modulate said coded information symbols, said M spreading sequences having the same energy $$\left（\sum_{n=1}^{N} s_{m,n}^2\right），$$

the amplitude of said chips taking a plurality of values; and said number M of spreading sequences being higher than the number of chips N per spreading sequence, characterized in that said symbols are coded with an efficient error correction code; and means for storing said non-orthogonal spreading sequences.

* * * * *